H. R. VON WINTERHALDER.
GEODETICAL UNIVERSAL INSTRUMENT.
APPLICATION FILED APR. 1, 1914.
1,114,422.
Patented Oct. 20, 1914.
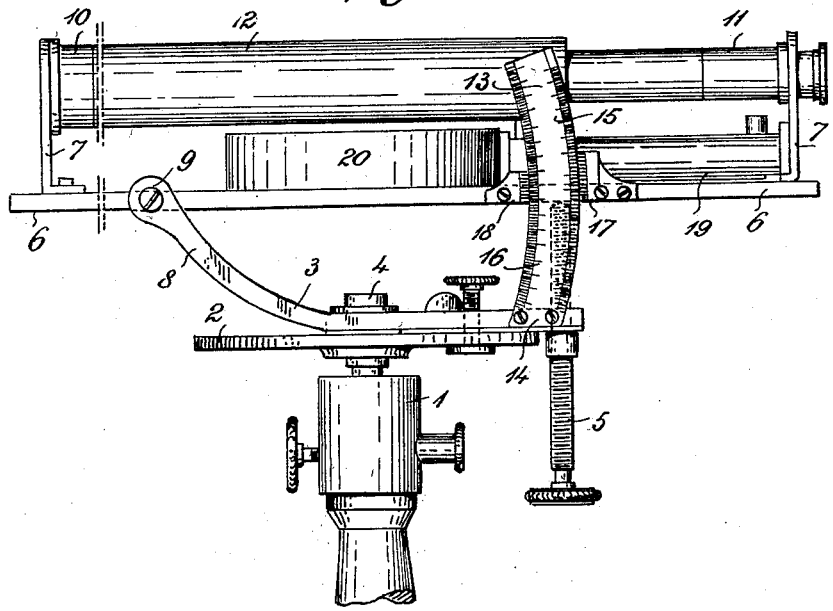
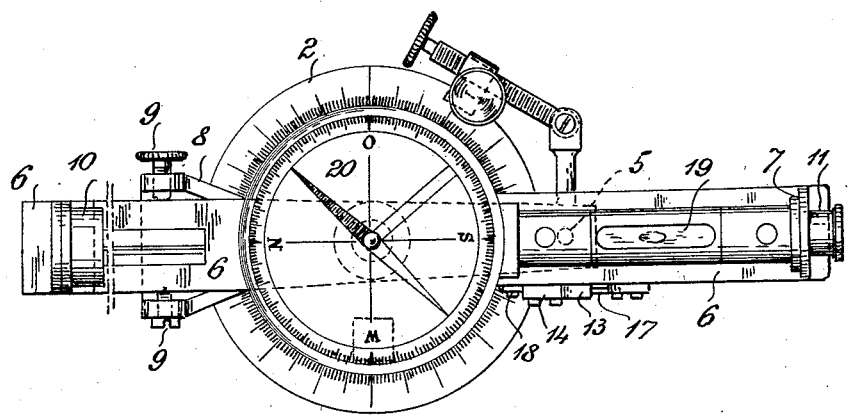
WITNESSES
C. E. Holske
A. H. Davis
INVENTOR
Hermann Ritter von Winterhalder
BY Munn & Co
ATTORNEYS.

UNITED STATES PATENT OFFICE.

HERMANN RITTER von WINTERHALDER, OF KLOSTERNEUBURG, NEAR VIENNA, AUSTRIA-HUNGARY.

GEODETICAL UNIVERSAL INSTRUMENT.

1,114,422.      Specification of Letters Patent.      Patented Oct. 20, 1914.

Application filed April 1, 1914. Serial No. 828,733.

*To all whom it may concern:*

Be it known that I, HERMANN RITTER VON WINTERHALDER, a subject of the Emperor of Austria-Hungary, residing at Klosterneuburg, near Vienna, Empire of Austria-Hungary, have invented certain new and useful Improvements in Geodetical Universal Instruments; and I do hereby declare the following to be a full, clear, and exact description of the invention, such as will enable others skilled in the art to which it appertains to make and use the same.

This invention relates to geodetical universal instruments.

According to my invention the telescope carrier is constructed as a diopter that is to say it comprises two sights connected by a rule and is readily detachable from the other parts of the instrument. Therefore my improved universal instrument can be used for measuring horizontal and vertical angles as well as for determining slopes and distances and also for work on the surveyor's table.

In the drawing Figure 1 is a side elevation and Fig. 2 is a plan of a geodetic universal instrument, the tubes of the telescope being omitted in Fig. 2.

The stand 1 carries a horizontal circle 2; an arm 3 journaled at 4 is adapted to turn above the circle 2. At one end of this arm an elevation screw 5 is mounted on which rests the telescope carrier and which consists of a diopter rule 6 with end plates 7. One end 8 of the arm 3 is provided with two screws 9 in alinement with each other and engaging into marks in the diopter rule so that the latter is adapted to turn around the common axis of the two screws in a vertical plane. To one of the end plates 7 the objective end 10 and to the other end plate the ocular end 11 of the telescope is secured; 12 indicates the telescope tubes.

The vertical circle or arc is secured at 14 to the arm 3 and is preferably provided with two scales, an angle scale 15 and a slope scale 16, and corresponding verniers secured to the diopter rule. For finally adjusting the instrument as to azimuth and elevation the usual micrometer-screws are provided. The elevation screw is preferably provided with a head having a scale for reading fine adjustments.

19 is a water level on the diopter rule and 20 is a compass.

As the axis of the elevation circle is not in the same vertical plane as the axis of the horizontal circle but on the side of the latter axis opposite the elevation screw the stability of the instrument is warranted even in case of comparatively large depression angles. The instrument is therefore suitable for determining horizontal and vertical angles, as also for measuring slopes and distances or ranges. After turning downward the objective end of the telescope so far that the diopter rule is disengaged from the vertical arc and after unscrewing one of the screws 9 the diopter together with telescope may be readily removed by slightly inclining the diopter rule for using the same on the surveyor's table.

In order that the instrument may be used without the telescope one of the supporting plates 7 is provided with an opening or openings and the other with a cross hair. The tubes of the telescope may be removed from the ends 10 and 11 so that for instance the compass may be conveniently read. Of course a complete telescope may be removably attached to the diopter rule. The instrument may also be used with advantage in mines.

Claims:

1. In a geodetical universal instrument the combination of a horizontal circle, a vertical arc, an arm carrying said arc and adapted to turn around the axis of the horizontal circle, a diopter, means for detachably pivoting the diopter to said arm in the center of the vertical arc means for turning such diopter around its pivots and a telescope supported in said diopter.

2. In a geodetical universal instrument the combination of a horizontal circle, a vertical arc, an arm carrying said arc and adapted to turn around the axis of the horizontal circle, a diopter, alined pointed screws in the said arm, located in the axis of the said vertical arc and engaging the diopter, an elevation screw screwed into the said arm and supporting the diopter and a telescope supported in the said diopter.

3. In a geodetical universal instrument the combination of a horizontal circle, a vertical arc, an arm carrying said arc and adapted to turn around the axis of the horizontal circle a diopter, means for detachably pivoting the diopter to said arm in the center of the vertical arc at one side of the axis of the horizontal circle, means mounted on said arm on the opposite side of the axis of the horizontal circle for turning such diopter around its pivots and a telescope supported in the said diopter.

4. In a geodetical universal instrument the combination of a horizontal circle, a vertical arc, an arm carrying said arc and adapted to turn around the axis of the horizontal circle a diopter, means for detachably pivoting the diopter to the said arm in the center of the vertical arc, means for turning such diopter around its pivots and a telescope and a compass supported in the said diopter.

In testimony whereof, I affix my signature, in presence of two witnesses.

HERMANN RITTER von WINTERHALDER.

Witnesses:
ARTHUR BAUMANN,
AUGUST FUGGER.

Copies of this patent may be obtained for five cents each, by addressing the "Commissioner of Patents, Washington, D. C."